Figure 1:
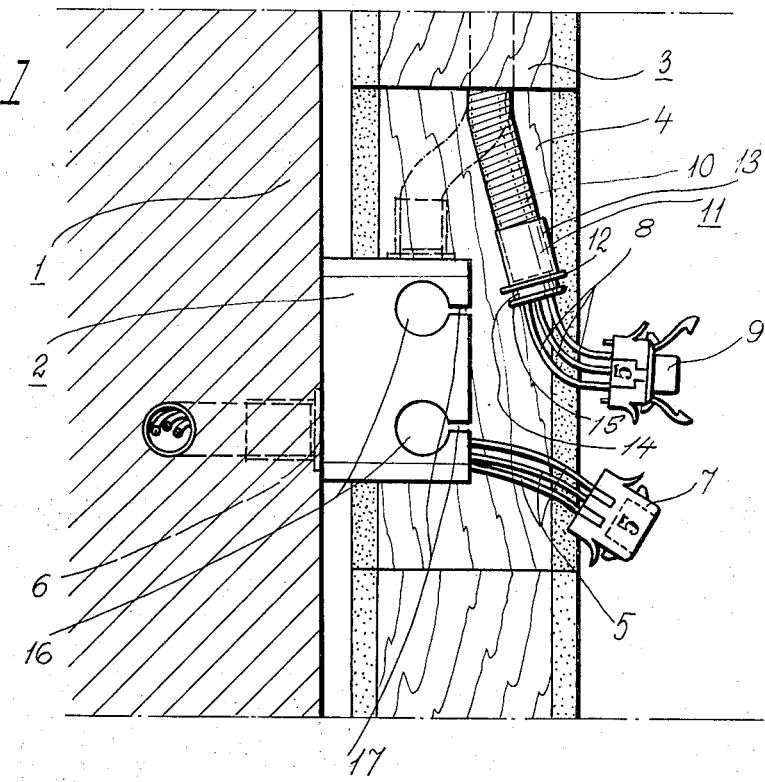

United States Patent [19]
Hundal

[11] 3,778,533
[45] Dec. 11, 1973

[54] DEVICE FOR JUNCTION BOXES
[76] Inventor: Kjell Hundal, Trombvagen 8, 175 00 Jakobsberg, Sweden
[22] Filed: Feb. 14, 1972
[21] Appl. No.: 226,044

[52] U.S. Cl. .............................. 174/65 R, 174/48
[51] Int. Cl. ............................................ H02g 3/18
[58] Field of Search ................. 174/65 R, 65 G, 48, 174/49; 285/128, 158

[56] References Cited
UNITED STATES PATENTS
| | | | |
|---|---|---|---|
| 2,324,791 | 7/1943 | McLoughlin et al. | 174/65 R X |
| 3,329,762 | 7/1967 | Miller | 174/65 R |
| 3,316,624 | 5/1967 | Brudevold | 174/49 UX |

Primary Examiner—Bernard A. Gilheany
Assistant Examiner—D. A. Tone
Attorney—Linton & Linton

[57] ABSTRACT

A junction box is made from a resilient plastic material and has in its envelope surface openings which via narrow slots open towards the open end portion of the box. The wires which are to be introduced in the box are preferably provided with connecting means for electrically connecting them with other wires and at least one of said wires is in addition thereto provided with a sleeve having a reduced portion the dimension of which corresponds to that of the openings such that said sleeve may be received therein. By exerting upon the surfaces at each side of said slot opposite directed pressures said sleeve may be secured to the box and the wires sideways introduced in the box.

1 Claim, 2 Drawing Figures

DEVICE FOR JUNCTION BOXES

The present invention relates to a device for junction boxes and the purpose thereof is to provide such a box, that makes the connection of electrical wires and wire groups considerably easier and said device being especially well adapted for use in connection with pre-manufactured structural units.

When in the prior art it has been desired to connect different wires or wire groups by wire laying using junction boxes the wires have hitherto been inserted through holes or sockets made in the junction box for this purpose, whereafter the wires have been stripped off and connected to each other. Such a process requires the connections to be made by an electrician and it is obvious that such installation works can be quite time consuming since the installer has to make sure that the wires are connected to each other in the intended manner. By the use of pre-manufactured structural bodies where of course it is desired that as much as possible of the installation work is already done by the time the units are delivered to a building yard the said process of the prior art is clearly unsatisfactory.

Thus, the primary purpose of the present invention is to provide a junction box that also enables the wires to be pre-manufactured so that the installation works can be made very rapidly in the building yard and even by a man not skilled in the art. To accomplish this and other purposes the invention has the characteristics disclosed in the following claims.

Figure 2:
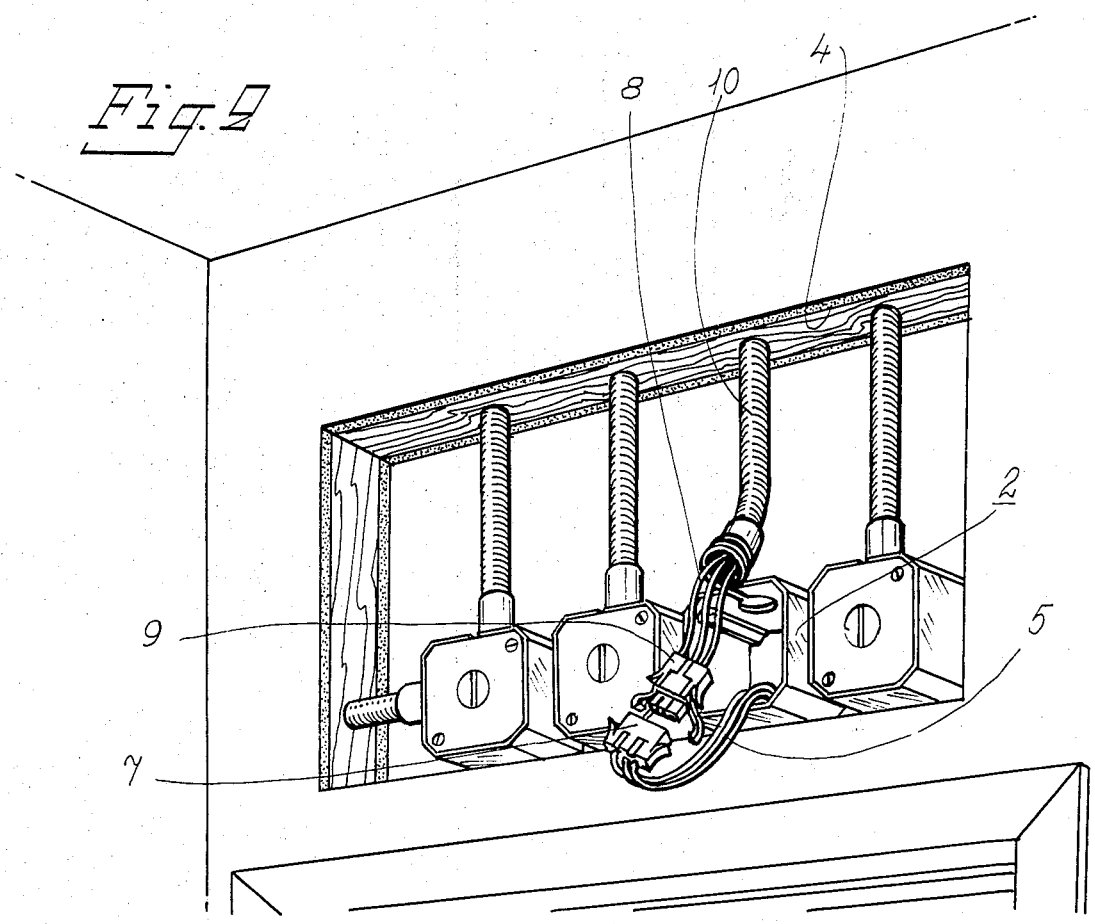

In the accompanying drawings an examplifying embodiment of the invention is illustrated, whereby:

FIG. 1 is a sectional view through two pre-manufactured structural bodies provided with the new connecting device and FIG. 2 is a perspective view of a door lintel comprising two premanufactured structural bodies contacting each other and including the new connecting device.

Referring to FIG. 1 reference number 1 designates a wall part of a pre-manufactured structural body. A number of junction boxes 2 are fixed to said wall part. A second pre-manufactured structural body, to be connected to the structural body 1, is provided with a rectangular opening 4, that can be closed by a cover, not shown, and said junction boxes, being fixed to the structural body 1, are accessible through said opening. Wires 5 belonging to the structural body 1 are preferably inserted through openings 6 in the bottom surface of the respective junction boxes 2. These wires or wire groups are pre-manufactured according to the invention by connecting means 7, known per se, to said wires or wire groups in order to enable connection to similar wires 8, belonging to the other structural body 3. Also the said wires 8 are pre-manufactured by the connection to connecting means 9, which means are to engage the connecting means 7. This connecting means 7 and 9 can be of any suitable kind and comprise a switch plug and a glove cooperating therewith; however, the connecting means are preferably of the type, known per se, illustrated in the drawing, and enabling the coupling of the connecting means in only one position in order to prevent a misconnection. The wires 8, which are not inserted through any of the openings in the junction box, are preferably surrounded by a flexible tube 10, which in turn is surrounded by a sleeve 11, suitably made of a flexible plastic material, such as polyethylene or the like, said sleeve being provided with a stop flange 12, from which there is extending an upwardly directed supporting housing 13 as well as a downwardly directed annular member 14 having a lower annular bead 15. The junction box has a number of openings 16 in the envelope surface thereof said openings being open in the direction of the front edge of the junction box through slots 17. By manufacturing the junction boxes from a material having elastically flexible characteristics it is possible to insert the wires 8 into the junction box by finger pressing the areas surrounding the slot in the junction box in directions opposite to each other. The cylindrical surface 14 of the sleeve thereby has a diameter approximately equal to the diameter of the opening 16 and it is to be understood that when the parts surrounding the opening 16 in the casing have been forced to snap below the flange 12, the lower edge bead 15 of the sleeve provides the fixing of the sleeve in the axial direction thereof while the material of the junction box after being brought in its original position also enables the fixing of the sleeve in a secure and effective manner to prevent the sleeve from moving in another direction.

As mentioned above using this embodiment makes it possible to premanufacture the wires so that anyone can correctly connect the wire groups to each other using a simple hand grip and thereafter using another simple hand grip to insert the wires and fix the sleeve to the junction box, whereafter said box can be closed by a cover, not shown. By applicating the invention to pre-manufactured structural bodies one structural body is provided with a number of junction boxes and the other structural body, being connectable to the first body, is provided with a corresponding opening, through which the junction boxes are made accessible and thereby electrical wire works are made considerably simpler and less expensive.

It is to be understood that the present invention is not limited to the illustrated embodiment but can be modified within the scope of the following claims. In order to further reduce the risk for misconnection for example the connecting means 7, 9, which are intended to cooperate with each other, are being marked with a common figure, letter, colour, or the like.

I claim:

1. A device for the connection of electrical wires comprising a junction box having an envelope surface thereof of an elastically resilient material and having an open front, side walls and a back wall connecting said side walls, at least one of said walls having at least one opening, at least one of said side walls having at least one annular opening and a slot extending from said side wall opening to the open front of said box, at least one rigid sleeve having a first annular flange having a greater diameter than said side wall opening, an annular portion which is substantially equal to the diameter of said side wall opening and a second annular flange having a diameter greater than said side wall opening and with said annular portion positioned between said flanges, a set of wires extending through said first wall opening, a further set of wires extending through said rigid sleeve, means for detachably connecting both sets of wires, said rigid sleeve annular portion detachably extending through said side wall opening with said first flange positioned inside and against said side wall and said second flange positioned exteriorly of and against said side wall whereby manually pressing said side wall on each side of said slot away from said slot a space is provided through which said sleeve and its wires may be removed from said box or inserted therein at which time said side wall will return to its normal position owing to the resiliency of its material.

* * * * *